United States Patent
Konagaya

(10) Patent No.: US 9,550,389 B2
(45) Date of Patent: *Jan. 24, 2017

(54) IMAGE ERASING METHOD THAT SELECTIVELY DECOLORS A SHEET BASED ON USER INFORMATION ENCODED ON THE SHEET

(71) Applicants: KABUSHIKI KAISHA TOSHIBA, Tokyo (JP); TOSHIBA TEC KABUSHIKI KAISHA, Tokyo (JP)

(72) Inventor: Shoh Konagaya, Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/019,012

(22) Filed: Feb. 9, 2016

(65) Prior Publication Data

US 2016/0152063 A1  Jun. 2, 2016

Related U.S. Application Data

(62) Division of application No. 14/145,695, filed on Dec. 31, 2013.

(51) Int. Cl.
*B41M 7/00* (2006.01)
*B41M 5/30* (2006.01)

(52) U.S. Cl.
CPC .......... *B41M 7/0009* (2013.01); *B41M 5/305* (2013.01); *H04N 2201/3226* (2013.01); *H04N 2201/3246* (2013.01); *H04N 2201/3269* (2013.01); *H04N 2201/3276* (2013.01)

(58) Field of Classification Search
None
See application file for complete search history.

(56) References Cited

U.S. PATENT DOCUMENTS

| | | | | |
|---|---|---|---|---|
| 6,978,112 B2* | 12/2005 | Kaburagi | ............... | G03G 21/04 399/365 |
| 7,428,076 B2* | 9/2008 | Bhattacharjya | ........ | G03G 15/50 358/3.28 |
| 8,274,709 B2* | 9/2012 | Kakutani | ........... | H04N 1/00846 358/1.14 |
| 8,456,497 B2* | 6/2013 | Iguchi | .................... | G03G 21/00 347/179 |
| 8,786,648 B1* | 7/2014 | Umetsu | .................... | B41J 29/36 347/179 |
| 8,797,564 B2* | 8/2014 | Suwabe | ................ | G06F 21/629 358/1.14 |

(Continued)

*Primary Examiner* — Justin Olamit
(74) *Attorney, Agent, or Firm* — Patterson & Sheridan, LLP

(57) ABSTRACT

An image erasing method includes reading a sheet having an image printed thereon with decolorable colorant and an owner information image printed thereon with decolorable colorant. The method further includes identifying a first owner information based on the owner information image, and receiving a second owner information. The method further includes determining a correlation between a user corresponding to the first owner information and a user corresponding to the second owner information. The method further includes selectively controlling a decoloring unit to decolor the image and the owner information image based on the correlation.

12 Claims, 3 Drawing Sheets

(56) References Cited

U.S. PATENT DOCUMENTS

| | | | | |
|---|---|---|---|---|
| 8,817,334 B2* | 8/2014 | Kikuchi | ............ | H04N 1/00846 358/448 |
| 2010/0118349 A1* | 5/2010 | Ozawa | ............... | H04N 1/00355 358/401 |
| 2011/0222130 A1* | 9/2011 | Iguchi | ................ | G03G 15/5062 358/452 |
| 2011/0236843 A1* | 9/2011 | Iguchi | ................ | H04N 1/00567 432/32 |
| 2011/0305851 A1* | 12/2011 | Wang | ...................... | B41M 5/52 428/32.31 |
| 2011/0317198 A1* | 12/2011 | Suzuki | ................. | B41M 7/0009 358/1.13 |
| 2012/0325101 A1 | 12/2012 | Tanaka et al. | | |
| 2012/0327487 A1 | 12/2012 | Kamisuwa et al. | | |

\* cited by examiner

FIG. 3

| NO. | USER ID | DEPARTMENT ID | START TIME AND DATE | END TIME AND DATE | SIZE | NUMBER OF SHEETS FED | ERASING COUNTER VALUE (NUMBER OF SHEETS ON WHICH COLORANT IS DECOLORED) | NUMBER OF SHEETS ON WHICH COLORANT IS NOT DECOLORED |
|---|---|---|---|---|---|---|---|---|
| 1 | 12345 | 0001 | 2013/8/1 9:30 | 2013/8/1 9:31 | A4 | 2 | 2 | 0 |
| 2 | 32158 | 0001 | 2013/8/5 9:20 | 2013/8/5 9:21 | A4 | 1 | 1 | 0 |
| 3 | 25871 | 0001 | 2013/8/5 15:55 | 2013/8/5 15:59 | A4 | 34 | 34 | 0 |
| 4 | 56954 | 0001 | 2013/8/6 13:01 | 2013/8/6 13:09 | A4 | 65 | 63 | 2 |
| 5 | 15236 | 5001 | 2013/8/6 18:22 | 2013/8/6 18:29 | A4 | 54 | 50 | 4 |
| 6 | 53548 | 0001 | 2013/8/7 10:55 | 2013/8/7 11:01 | A4 | 37 | 37 | 0 |
| 7 | | | ... | | ... | | | ... |
| ... | | | | | | | | |

42

IMAGE ERASING METHOD THAT SELECTIVELY DECOLORS A SHEET BASED ON USER INFORMATION ENCODED ON THE SHEET

CROSS-REFERENCE TO RELATED APPLICATION

This application is a division of U.S. patent application Ser. No. 14/145,695, filed on Dec. 31, 2013, the entire contents of each of which are incorporated herein by reference.

FIELD

Embodiments described herein relate generally to an image erasing apparatus, and an image erasing method.

BACKGROUND

A decoloring apparatus configured to decolor a colorant from a sheet on which an image is formed using a decolorable colorant and in which the number of sheets on which the colorant is decolored is counted, and the amount of a reduction in environmental burdens is displayed based on the number of the sheets on which the colorant is decolored is known in the related art. In addition, a decoloring apparatus including a card reader, in which the card reader stores the number of colorant-decolored sheets for each user authenticated by an ID card, and an environmental load contribution ratio is displayed for each user is known. An environmental contribution supporting apparatus is also known in which the number of saved sheets of a group to which a user belongs is calculated from the number of reduced sheets for the group to give a score regarding a reduction in environmental burdens.

In the image erasing apparatus in which the number of colorant-decolored sheets is controlled for each user or group, a method of counting up, whenever an image is erased, an erasing counter based on user information or group information which is authenticated during use of the image erasing apparatus is generally used.

However, in such image erasing apparatus, it is impossible to determine whether or not an authenticated operator is the owner of an image. In the image erasing apparatus, when an image is erased, it is impossible to determine whether or not the erased image belongs to a user or group (hereinafter, also referred to as "owner") that prints the image. Therefore, there is a problem in that, for example, even if another owner erases an image on a sheet, an erasing counter of the authenticated user or group is counted up. If a sheet on which an image of another owner is formed or a sheet of another owner which is mixed with sheets of the owner passes through the image erasing apparatus, the image on the sheet may be erased.

DESCRIPTION OF THE DRAWINGS

FIG. 3 is a diagram illustrating an arrangement of data in a storage unit of the image erasing apparatus according to the embodiment.

DETAILED DESCRIPTION

Figure 1:
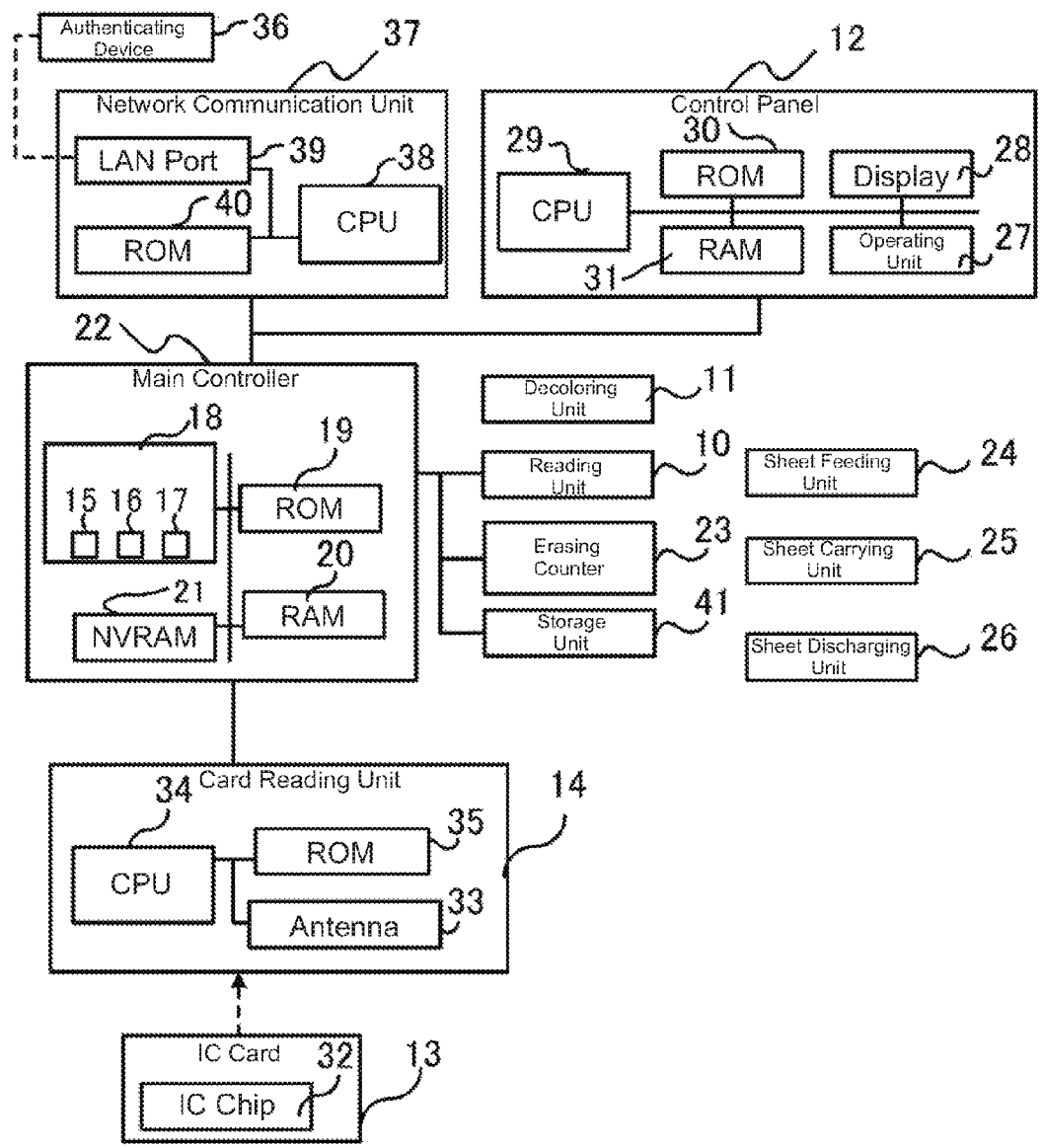
FIG. 1 is a functional block diagram illustrating an image erasing apparatus according to one embodiment.

An image erasing apparatus according to an embodiment comprises a reading unit configured to read a sheet having an image printed thereon with decolorable colorant and an owner information image printed thereon with decolorable colorant, and to identify a first owner information based on the owner information image. The apparatus further comprises a decoloring unit configured to decolor the image and the owner information image on the sheet read by the reading unit and an authenticating unit configured to receive a second owner information. The apparatus further comprises a determining unit configured to determine a correlation between a user corresponding to the first owner information and a user corresponding to the second owner information, and an erasing controller configured to selectively control the decoloring unit to decolor the image and the owner information image based on the correlation.

Hereinafter, an image erasing apparatus and an image erasing method according to embodiments will be described referring to FIGS. 1 to 3. In the respective drawings, the same components are represented by the same reference numerals, and the description thereof will not be repeated.

FIG. 1 is a functional block diagram illustrating an image erasing apparatus according to one embodiment. The image erasing apparatus according to the embodiment includes a reading unit 10, a decoloring unit 11, and a control panel 12. The reading unit 10 reads a sheet on which an image and a two-dimensional code (owner information image)—including user information or group information for authenticating an owner of the image (first owner information)—are formed. The two-dimensional code is used to identify the user information or group information. The decoloring unit 11 decolors a colorant of the sheet read by the reading unit 10. The control panel 12 displays the number of sheets on which the colorant is decolored by the decoloring unit 11. The image includes page contents such as letters, sentences, drawings, and pictures which are printed in a page. The two-dimensional code refers to a matrix code such as QR code (registered trademark) or a text string. The image described herein is printed on the sheet using a decolorable colorant in response to an instruction from a user terminal such as PC to a multifunctional peripheral (MFP). The image is created and printed by a user, or is printed based on a file distributed by another person or based on a page downloaded from the Internet.

Moreover, the image erasing apparatus according to the embodiment further includes a card reading unit 14 and an authenticating unit 15. The card reading unit 14 reads information included in an IC card 13 of an operator to output this information as user information or group information (second owner information). The authenticating unit 15 authenticates the operator based on the user information or group information output from the card reading unit 14 or from the control panel 12. The image erasing apparatus further includes a determining unit 16 and an erasing controller 17. The determining unit 16 determines whether or not the decoloring unit 11 is to decolor the colorant of the image on the sheet, based on the user information or group information authenticated by the authenticating unit 15 and the user information or group information obtained from the image on the sheet. The erasing controller 17 controls the decoloring unit 11 to decolor the colorant of the image on the sheet based on a determination result of the determining unit 16 regarding whether or not to decolor the colorant. The image erasing apparatus includes a main controller 22, an erasing counter 23, and a storage unit 41. The main controller 22 controls the authenticating unit 15, the determining unit 16, and the erasing controller 17 to function and performs the overall control. The erasing counter 23 counts the number of sheets on which the colorant is decolored by the decoloring unit 11. The storage unit 41 stores a list of plural users, a list of plural groups, and an erasing log for each user or each group. The image erasing apparatus further includes a sheet feeding unit 24, a sheet carrying unit 25, and a sheet discharging unit 26 The sheet carrying unit 25 carries the sheet, which is fed by the sheet feeding unit 24, to the reading unit 10 and the decoloring unit 11 and discharges the sheet through a discharge port (not illustrated) while carrying or stopping the sheet. The sheet discharging unit 26 is provided at the discharge port and discharges a sheet on which the colorant is decolored or a sheet on which the colorant is not decolored.

The reading unit 10 scans a sheet surface on which the image and the two-dimensional code are printed, recognizes the image from a scan output result to extract the two-dimensional code, and analyzes the two-dimensional code to identify the user information. The two-dimensional code is positioned, for example, on a blank space or a margin of a printed page. The size of a square surrounding the two-dimensional code is greater than the dimension of which the image can be recognized and is less than the dimension that causes the two-dimensional code to be out of a page margin or the like. The user information refers to information for identifying an individual as an image owner, for example, refers to a user ID. The group information refers to information for identifying a group such as a department, an office, or a company to which a user belongs, for example, refers to a department ID. The reading unit 10 includes an image scanner and a processor for executing an application program. The processor extracts a position specifying element of the two-dimensional code from the scan output image and determines the position of the two-dimensional code based on the position specifying element.

The decoloring unit 11 heats the sheet, on which an image is formed by the MFP using a decolorable toner, to decolor the toner. The decoloring unit 11 includes, for example, a heating unit, a roller, and a mechanism for pressing the roller against the heating unit to be in contact with each other and heats the colorant along with the sheet to a decoloring temperature, which is determined by the toner, to be decolored. The heating unit faces a sheet surface. The roller is arranged opposite the heating unit. The sheet is carried while being interposed at a nip portion between the heating unit and the roller. Toner particles of the decolorable toner include a color material and a binder resin. The color material is obtained, for example, by encapsulating a color-developing compound, a developer, a decolorable temperature controller, and the like. The binder resin binds the color materials to each other.

The control panel 12 notifies the main controller 22 of user information or group information which is directly input by an operator. The control panel 12 includes an operating unit 27, a display 28, a panel CPU 29, a ROM 30, and a RAM 31. The operating unit 27 converts a key input regarding the user information and the like, a selection operation, and a condition setting into signals. The display 28 displays the number of sheets on which the colorant is decolored along with the user information or group information. The panel CPU 29, the ROM 30, and the RAM 31 drive and control the operating unit 27 and the display 28.

The IC card 13 is a radio medium for identifying individuals and is equipped with an IC chip 32 (or an RFID chip). The card reading unit 14 includes an antenna 33, a reading unit CPU 34, and a ROM 35. The antenna performs near field communication with the IC chip 32, which is built in the IC card 13, through electromagnetic induction or radio wave transmission and reception. The reading unit CPU 34 extracts the user information and the like from data signals, which are demodulated by the antenna 33, and outputs the user information and the like. The ROM 35 stores a program.

The authenticating unit 15 authenticates a user who uses the image erasing apparatus, based on a pre-stored list file of users or groups. The determining unit 16 notifies the control panel 12 of a result regarding the number of sheets on which the colorant is decolored and the number of sheets on which the colorant is not decolored with respect to the number of sheets fed. The erasing controller 17 controls the erasing counter 23 to be counted up based on a determination result of the determining unit 16 in which the user information input from the card reading unit 14 matches with the user information input into the control panel 12. The erasing controller 17 controls the sheet carrying unit 25 to discharge the sheet without controlling the decoloring unit 11 to decolor the colorant of the image, based on a determination result in which the user information input from the card reading unit 14 does not match with the user information input into the control panel 12.

The main controller 22 verifies the user information or group information which is input for authentication through the card reading unit 14. The main controller 22 can read information from the storage unit 41 in which names of plural users and names of groups to which the users belong are stored. Each user name is associated with one or more group names. The storage unit 41 is, for example, a hard disk drive or a silicon disk drive. The main controller 22 includes a main CPU 18 and a ROM 19, wherein the ROM 19 stores a program which allows the main CPU 18 to function as the authenticating unit 15, the determining unit 16, and the erasing controller 17. The main controller 22 includes a work RAM 20 and a non-volatile memory (NVRAM) 21. The NVRAM 21 stores determination condition information for determining whether for the sheet to be reused or rejected and setting temperature information of the decoloring unit 11. The main controller 22 is connected to a network communication unit 37 for authentication using an external authenticating device 36. The main controller 22 transmits the user information or group information, which is input from the card reading unit 14, to the authenticating device 36 and can acquire an authentication result from the authenticating device 36. The network communication unit 37 includes a communication unit CPU 38, a LAN port 39, and a ROM 40 which are provided for communicating with the main controller 22 and the authenticating device 36.

When the image erasing apparatus according to the embodiment having the above-described configuration is turned on, the main controller 22 displays a log-in screen on the control panel 12. The image erasing apparatus may require a user to input a login ID and a password through the control panel 12.

Figure 2:
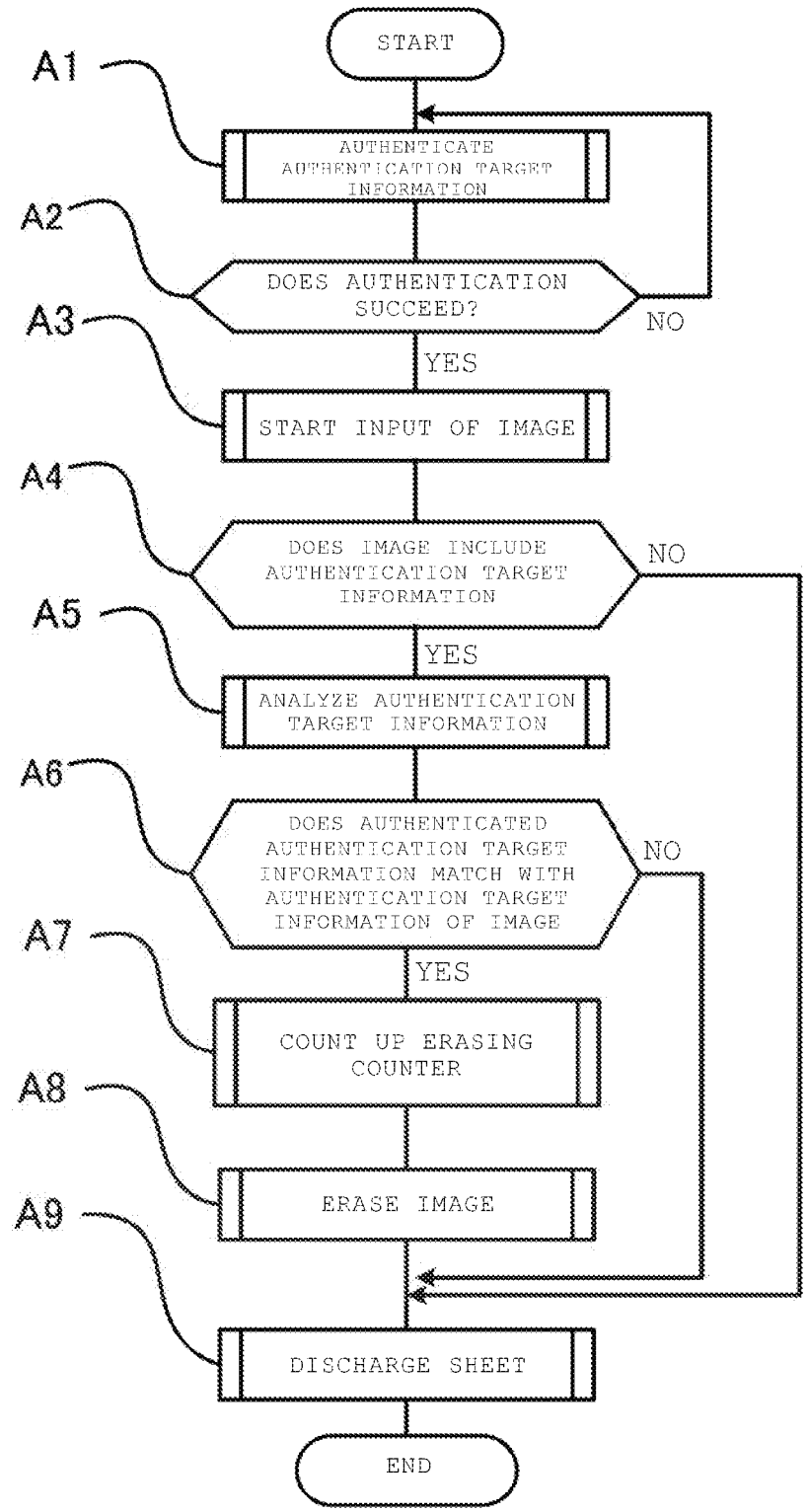
FIG. 2 is a flowchart illustrating an operation of a decoloring process using the image erasing apparatus according to the embodiment.

FIG. 2 is a flowchart illustrating an operation of a decoloring process in the image erasing apparatus. After a user is logged in, the control panel 12 displays a screen for encouraging the user to holdup the IC card 13 for the decoloring process or a screen for encouraging the user to input the user information. In ACT A1, first, the authenticating unit 15 of the image erasing apparatus authenticates authentication target information (user information or group information). In ACT A2, the authenticating unit 15 determines whether the authentication of the user information received from the card reading unit 14 or the user information directly input into the control panel 12 succeeds or fails. In ACT A2, if the authentication succeeds, the authenticating unit 15 allows the control panel 12 to display the authentication success, and the process proceeds to ACT A3 through YES route. If the authentication fails, the authenticating unit 15 allows the control panel 12 to display the authentication failure, and the process returns to ACT A1 through NO route.

In ACT A3, the image erasing apparatus starts the input of an image which will be erased. In ACT A4, the reading unit 10 determines whether or not a scanned image includes the authentication target information. If the scanned image includes the authentication target information, the process proceeds to ACT A5 through YES route based on the determination result of the reading unit 10. In ACT A5, the reading unit 10 analyzes the authentication target information.

Next, in ACT A6, the determining unit 16 determines whether or not the user information which is recognized through the image analysis matches with the user information which is authenticated in ACT A2. If the determination result is a match, the process proceeds to ACT A7 through YES route. In ACT A7, the determining unit 16 (or the main controller 22) counts up the erasing counter linked to the corresponding user information or group information. In ACT A8, the decoloring unit 11 decolors the colorant. In ACT A9, the sheet carrying unit 25 discharges the sheet, on which the colorant is decolored, to the sheet discharging unit 26. The control panel 12 displays the completion of the decoloring process and displays a result of the erasing counter 23 along with the user information. The control panel 12 may simultaneously display information of a group to which the user belongs and an actual result of this group regarding the total number of sheets on which the colorant is decolored. The image erasing apparatus finishes the process when the user logs out. In ACT A4, if the reading unit 10 determines that the scanned image does not include the authentication target information, the process proceeds to ACT A9 through NO route. In ACT A9, the image erasing apparatus discharges the sheet without decoloring the colorant on the sheet. In ACT A6, if the determination result is a mismatch, the process proceeds to ACT A9 through NO route. In ACT A9, the image erasing apparatus discharges the sheet without decoloring the colorant on the sheet.

If plural sheets are fed batchwise to the sheet feeding unit 24, the image erasing apparatus repeats the processes from the ACT A3 to ACT A9. After the authentication using the IC card 13 succeeds, the determining unit 16 may store the user information authenticated by the IC card 13 to determine whether or not the authenticated user information matches with the user information in the image whenever the sheet is read. Alternatively, after the authentication using the IC card 13 is performed for each sheet of the plural sheets, the determining unit 16 may determine whether or not the authenticated user information matches with the user information in the image in order to perform strict management. One of the above processes is selected by the control panel 12. If the processes from ACT A3 to ACT A9 are completed, the control panel 12 displays: the completion of the decoloring process, the number of sheets on which the colorant is decolored during the log-in session, the number of sheets on which the colorant is not decolored during the log-in session, the value of the erasing counter 23, and the user information.

FIG. 3 is a diagram illustrating a log example of the storage unit 41 of the image erasing apparatus according to the embodiment. Major elements of a log 42 include, as items, "User ID" indicating the user information; "Department ID" indicating the group information; "Start Time and Date" and "End Time and Date" of the decoloring process; "Size" indicating the size of the sheet; "Number of Sheets Fed" indicating the number of sheets which are fed; "Erasing Counter Value" identical to the number of sheets on which the colorant is decolored; and "Number of Sheets On Which Colorant Is Not Decolored" indicating the number of sheets which are discharged based on the determination result of "No Image" or "Mismatch". These items associate with process serial number "No." For examples, the erasing counter values of users having user IDs "12345", "32158", "25871", "56954", and "53548" are "2", "34", "63", and "37", respectively. The total erasing counter value of a department having department ID "0001" to which the 5 users belong is recorded as 137 which is the sum of the erasing counter values of the users. The erasing counter value of a user having user ID "15236" which belongs to another department is recorded as 50. The erasing counter values are controlled for each user and each group.

As described above, only when the authentication target information obtained from the image matches with the authentication target information obtained from the IC card 13 or the like, the colorant is decolored, and the erasing counter 23 is counted up. The image erasing apparatus authenticates an owner of an image on a sheet to specify the owner, authenticates an operator, and decolors a colorant on the sheet when determining that the owner is intended to erase the image. After obtaining owner information of an operator through the IC card 13 first, owner information in an image may be obtained to determine whether or not the owner information matches with one another.

With such a configuration, only when an authenticated user or group erases a printed image on a sheet, the erasing counter is counted up. Therefore, the erasing counter 23 can be appropriately controlled.

In the image erasing apparatus and the image erasing method according to the embodiments, the authentication of an owner of an image on a sheet and the authentication of an operator of the image erasing apparatus are performed. Then, only when these authentication results match with each other, a colorant on the sheet is decolored. Accordingly, an actual result regarding the number of sheets on which the colorant is decolored can be reliably controlled by a user linked to the image. In addition, the user can reject the decoloring process of a sheet on which an image is printed by another user or group such that an image of another user is not erased. Therefore, an inappropriate use form can be prevented. For example, the number of sheets on which the colorant is decolored is not counted up by an image on a sheet of another user. In the other words, even if a sheet on which an image of the user is formed is mixed with sheets of another user or another department, the colorant of the image on the sheet of the user is not erroneously decolored by another user, and the number of sheets on which the colorant is decolored is not counted up by another user.

By operating the control panel 12, the erasing controller 17 may control the number of sheets on which the colorant is decolored to be transferred between users. For example, if each group attempts to achieve the number of saved sheets, the numbers of sheets on which the colorant is decolored can be averaged between users which belong to one group.

(First Modification Example)

An image erasing apparatus according to a first modification example of the embodiment has the same configuration as that of FIG. 1. In the image erasing apparatus according to the embodiment, whether to decolor the colorant or not is determined based on the authentication of the user. However, the decoloring process may be allowed to be performed depending on each group. The determining unit 16 compares a department name (first group name) with another department name (second group name) to determine whether or not these department names match with each other. The first group name is obtained from the storage unit 41 using user information or group information for authentication, which was input into the card reading unit 14. The second group name is obtained from the storage unit 41 using user information or group information for authentication included in an image. When the user decolors a colorant on a sheet which is printed by himself or herself and when the user decolors a colorant on a sheet which is printed by another user of the same department, the determining unit 16 outputs a determination result indicating a match. The erasing controller 17 controls the decoloring unit 11 to decolor the colorant based on the determination result of a match.

As a result, the user can decolor the colorant on a sheet of another user which belongs to the same group, and a user of another group is not allowed to decolor the colorant on the sheet. For example, plural users in each department can control the erasing counter value, thereby usability is improved.

(Second Modification Example)

An image erasing apparatus according to a second modification example also has the same configuration as that of FIG. 1. In the above-described embodiment, the two-dimensional code indicating an owner of an image is printed on a sheet. However, the two-dimensional code may include information of properties such as a sheet printing date, an expiration date, a sheet printing place, and a sheet content. The reading unit 11 extracts the information of these properties and determines whether or not a decoloring process is prohibited based on the information of the properties. For example, the determining unit 16 determines whether an image is in an erasing prohibition period or not based on a comparison result of the expiration date, the sheet printing date, and the system time. The erasing controller 17 discharges a sheet without decoloring a colorant on the sheet before the expiration of this period, and decolors the colorant on the sheet and discharges the sheet after the expiration of the period. As a result, the document management can be performed more strictly.

The determining unit 16 may set default settings for erasing conditions depending on each sheet printing place such as a floor or an area where the MFP is installed. For example, a usage can be adopted in which a sheet which is printed in a head office cannot be erased in a branch office or a business office. In addition, a usage can also be adopted in which the decoloring process for sheets printed in a floor or an area where an outsider can enter is allowed, whereas the decoloring process for sheets printed in a management target floor or area is prohibited. That is, an existing confidentiality management can be operationally reinforced. Regarding the content itself of the printed sheet, prohibition information of decoloring process may be included in the two-dimensional code.

In the above-described embodiment, for example, an image and the owner information image such as a two-dimensional code are printed on the same surface of the sheet. However, a mechanism for inverting front and back surfaces of a sheet may be provided, or the owner information image may be provided for both front and back surfaces of a sheet such that the image erasing apparatus can decolor the colorant on a sheet in which an image and the owner information image are formed on different surfaces thereof. As the two-dimensional code, a stack type code in which plural one-dimensional barcodes are vertically stacked may be used instead of the matrix code. As the owner information image, a mark, an icon, or a seal indicating an owner (user or group) may also be used. As the owner information image, a plain text string or an encrypted text string may also be used. In this case, the reading unit 10 has a function of decrypting the encrypted text string. The erasing counter 23 may be mounted on the decoloring unit 11 or the main controller 22. As the IC card 13 and the card reading unit 14, a magnetic card or a magnetic reader may be used instead of the radio type. Even if the image erasing apparatus according to the embodiment is modified as described above, the superiority of the image erasing apparatus according to the embodiment does not deteriorate.

Before ACT A1 of FIG. 2, the authenticating unit 15, the storage unit 41, or the main controller 22 updates a list of the user information or group information to be authenticated. For the update, a USB memory may be used, or a file containing a list of the user information or group information to be authenticated may be downloaded from a management server apparatus through the network communication unit 37.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image erasing method comprising:
    reading a sheet having an image printed thereon with decolorable colorant and an owner information image printed thereon with decolorable colorant,
    identifying a first owner information based on the owner information image;
    receiving a second owner information;
    determining whether to decolor the image based on a correlation between a user corresponding to the first owner information and a user corresponding to the second owner information; and
    selectively controlling a decoloring unit to decolor the image and the owner information image based on the determination.

2. The method according to claim 1, wherein the user corresponding to the first owner information is a group and the user corresponding to the second owner information is an individual, and the user corresponding to the first owner information is determined to be the same as the user corresponding to the second owner information if the individual is a member of the group.

3. The method according to claim 1, further comprising:
    counting a number of sheets on which the image and the owner information image is decolored when the user corresponding to the first owner information is determined to be the same as the user corresponding to the second owner information.

4. The method according to claim 3, further comprising:
    displaying the number of sheets counted.

5. The method according to claim 1, further comprising:
    discharging the sheet through a discharge port, wherein if the user corresponding to the first owner information is determined to not be the same as the user corresponding to the second owner information, the decoloring unit is controlled to not decolor the image and the owner information image.

6. The method according to claim 5, further comprising:
displaying a number of sheets discharged and not decolored.

7. The method according to claim 1, further comprising:
storing, in a storage unit, a plurality of user names and a plurality of group names of groups which include the user names, wherein
the determining step includes:
  retrieving a first group name from the storage unit based on the first owner information and a second group name from the storage unit based on the second owner information, and
  comparing the first group name with the second group name, and the selectively controlling step includes:
  controlling the decoloring unit to decolor the colorant if, based on the comparison in the determining step, the first group name is the same as the second group name.

8. The method according to claim 1, wherein:
the owner information image includes document properties comprising one or more of: an expiration date, a sheet printing date, a sheet printing place, and a sheet content, and
the selectively controlling step includes controlling the decoloring unit to not decolor the image and the owner information image on the sheet based on the document properties.

9. A method of processing a sheet printed with decolorable colorant, the method comprising:
  scanning a surface of the sheet, the surface having an owner information image printed thereon with decolorable colorant,
  identifying a first owner information based on the owner information image;
  receiving input of a second owner information;
  determining a correlation between a user corresponding to the first owner information and a user corresponding to the second owner information;
  determining whether to decolor the sheet based on the correlation; and
  controlling a decoloring unit based on the determination of whether to decolor the sheet.

10. The method according to claim 9, wherein:
if the user corresponding to the first owner information is determined to be the same as the user corresponding to the second owner information, the decoloring unit is controlled to decolor the sheet.

11. The method according to claim 10, wherein:
if the user corresponding to the first owner information is determined to not be the same as the user corresponding to the second owner information, the decoloring unit is controlled to not decolor the sheet.

12. The method according to claim 9, wherein:
the owner information image includes document properties comprising one or more of: an expiration date, a sheet printing date, a sheet printing place, and a sheet content, and
the controlling step includes controlling the decoloring unit based on the document properties.

* * * * *